United States Patent [19]

Weaver

[11] Patent Number: 4,617,227
[45] Date of Patent: Oct. 14, 1986

[54] ASPHALT ELASTOMERIC BLENDS

[75] Inventor: Ebon P. Weaver, Naugatuck, Conn.

[73] Assignee: Uniroyal Chemical Company, Inc., Middlebury, Conn.

[21] Appl. No.: 710,813

[22] Filed: Mar. 12, 1985

[51] Int. Cl.$^4$ .................. C08L 95/00; B32B 11/02
[52] U.S. Cl. .................. 428/220; 524/69; 524/70; 524/71
[58] Field of Search ............ 524/69, 71, 70; 428/220

[56] References Cited

U.S. PATENT DOCUMENTS

| | | | |
|---|---|---|---|
| 4,304,697 | 12/1981 | Agarwal et al. | 524/211 |
| 4,310,457 | 1/1982 | Agarwal et al. | 524/399 |
| 4,338,229 | 7/1982 | Agarwal et al. | 524/399 |
| 4,362,828 | 12/1982 | Agarwal et al. | 524/70 |
| 4,371,641 | 2/1983 | Boyer | 524/70 |
| 4,376,179 | 3/1983 | Agarwal et al. | 524/211 |
| 4,385,141 | 5/1983 | Agarwal et al. | 524/66 |
| 4,483,960 | 11/1984 | Agarwal et al. | 524/547 |

FOREIGN PATENT DOCUMENTS 38721 10/1981 European Pat. Off. .............. 524/70

*Primary Examiner*—Herbert J. Lilling
*Attorney, Agent, or Firm*—William E. Dickheiser; John A. Shedden

[57] ABSTRACT

A waterproof membrane useful as a coating or flashing for roofs or as a liner for containing liquids which comprises a composition containing a neutralized sulfonated EPDM polymer and asphalt, the former component comprising at least 30% by weight of the total weight of the polymer and asphalt. The composition has outstanding physical properties and an unexpectedly high tensile strength.

11 Claims, No Drawings

ASPHALT ELASTOMERIC BLENDS

BACKGROUND OF THE INVENTION

It has long been desired to prepare compositions for roof membranes, roof flashing, and liners to contain liquids for such applications as pools and for holding waste liquids. Naturally, to be commercially acceptable, such compositions must be low in cost and have good physical properties. Because of the ready availability of asphalt and its comparatively inexpensive price, this material has found wide application in this area. Unfortunately, the physical properties of asphalt leave much to be desired. Conventional asphalt's resistance to oxidation and ultraviolet radiation and its tensile strength are not sufficient.

To overcome these problems, a minor amount of elastomeric materials has to be added to asphalt. For example, Boyer et al. in U.S. Pat. No. 4,371,641 shows the addition of from 5 to 25 wt. % of a neutralized sulfonated polymer to 100 parts of bitumen. The invention specifically teaches that it is preferred to use only about from 7 to about 20 parts of the polymer. The preferred embodiments, shown in the examples, all add 10 parts per hundred.

Physical properties of the above compositions are improved in contrast to the bitumen per se; however, in general, the properties of such compositions still fell far short of those desired for the rigorous environmental and/or structural conditions to which such compositions are exposed in that, in order to obtain satisfactory performance, thick sections often had to be utilized as well as reinforcing material.

Other references show the use of a broad range of polymeric material to modify the properties of asphalt compositions. For example, U.S. Pat. Nos. 4,328,147 and 4,382,989 to Chang et al. show the addition of 1 to 8 wt. % of an oxidized polyethylene to a roofing asphalt formulation. The purpose here is to affect the softening point, penetration and viscosity of blends. Such small amounts of polymer, however, would not be effective in increasing the tensile strength of the composition to that considered necessary for waterproof membrane applications.

Rollmann, in U.S. Pat. No. 4,460,723, shows the addition of various polymers to asphalt to broaden the useful temperature range of the asphalt composition by improving its ductility at low temperature and its resistance to flow at elevated temperatures. Many rubbery polymers are described, including polybutadene, polyisoprene, natural rubber, butadiene/styrene copolymers, ethylene/propylene/diene terpolymers, isobutylene/isoprene copolymers, and isoprene/styrene copolymers. The elastomer is present from about 1 to about 30 wt. %, preferably from 5 to 20 wt. %, based on the total asphalt composition. Because of the limited amount of the rubbery polymer used and the particular polymers selected, such compositions do not enjoy particularly high tensile strength and therefore they would not be suitable for numerous membrane applications.

BREIF DESCRIPTION OF THE INVENTION

The instant invention relates to an improved composition containing a neutralized sulfonated ethylene/propylene/diene polymer (hereinafter an "ionic elastomer") and an asphalt wherein the former comprises at least 30% of the total weight of the polymer and asphalt. Additionally, as described hereafter, the composition may also contain fillers, extender oils, and other conventional additives, such as antioxidants, antiozonants, and UV stabilizers. It is essential in the practice of the instant invention that the sulfonated EPDM composition be at least partially neutralized; that is, the sulfonate groups must be treated with a neutralizing agent, and a preferential plasticizer be incorporated as hereinafter described.

Surprisingly, the aforesaid compositions have outstanding physical properties and an unexpectedly high tensile strength. As a matter of fact, the tensile strength of these compositions exceeds the tensile strength of the ionic elastomer per se and naturally is considerably higher than the unformulated asphalt. While the prior art cited above shows that there is a tensile strength increase by adding low amounts of neutralized sulfonated EPDM to asphalt, the tensile strengths achieved were no greater than the polymeric material added thereto. By employing higher amounts of the polymeric material in the formulation, it has been discovered that the tensile strength continues to rise to a point severalfold higher than the ionic elastomer per se. This is most unexpected. Such outstanding tensile strength, while perhaps not too important in road building, is particularly important where the purpose of the formulation is to form a waterproof membrane. As will be readily apparent to those skilled in the art, waterproof membranes used to contain liquids are subject to an extremely high degree of tensile stress.

DETAILED DESCRIPTION OF THE INVENTION

In the practice of the invention, the ratio of the neutralized sulfonated EPDM to the asphalt is from 30/70 to 95/5, preferably from 50/50 to 80/20. Contrasted to the prior art, the compositions of the invention contain a substantial amount of the ionic elastomer.

A wide variety of bituminous materials may be used in the practice of the invention. Generally, tars and asphalts having softening points from 45° C. to 110° C., preferably from 50° C. to 100° C., are used. The aforesaid compositions are generally obtained by the removal of volatile constituents from crude petroleum, generally by distillation, initially at atmospheric pressure and thereafter under vacuum.

The neutralized sulfonated EPDM polymers are from elastomeric polymers having either olefinic or aromatic unsaturation sites. In particular, unsaturated elastomeric polymers include low unsaturated polymers such as butyl rubber and EPDM, and highly unsaturated polymers such as polybutadiene and polyisoprene. In addition to these elastomers, suitable sulfonic acid-containing copolymers may be prepared by the polymerization of ethylene or propylene with multiolefins such as 1,4-hexadiene, dicyclopentadiene, norbornadiene, 5-methylene-2-norbornene, 5-ethylidene-2-norbornene, 5-propenyl-2-norbornene and 1,5-cyclooctadiene. Preferably, these polymers have incorporated therein about 0.2 to about 10 mole % unsaturation, more preferably about 0.5 to about 6 mole %. The preferred polymers are based on EPDM.

Though the term "olefinic unsaturation" does not include aromatic unsaturation, the polymer backbone may contain aromatic rings either within the backbone structure or pendant therefrom. Sulfonation, however, is preferentially carried out at the site of olefinic unsaturation rather than on the aromatic rings.

The term "EPDM" is used as defined in ASTM D-1418-64 and refers to a terpolymer containing ethylene and propylene in the backbone, and unsaturation in the side chain. Illustrative methods for producing these terpolymers are found in U.S. Pat. No. 3,280,082, British Pat. No. 1,030,289 and French Pat. No. 1,386,600, herein incorporated by reference. The preferred polymers contain about 45 to about 80 wt. % ethylene and about 1 to about 10 wt. % of a diene monomer, the balance of the polymer being propylene. Preferably, the polymer contains about 50 to about 70 wt. % ethylene and about 1.0 to about 8.0 wt. % diene monomer. The diene monomer is preferably a non-conjugated diene.

Examples of these non-conjugated diene monomers which may be used in the EPDM terpolymer are 1,4-hexadiene, dicyclopentadiene, 5-ethylidene-2-norbornene, 5-methylene-2-norbornene, 5-propenyl-2-norbornene and methyl tetrahydroindene. A typical EPDM is Vistalon 2504 (Exxon Chemical Co.), a terpolymer having a Mooney viscosity (ML, 1+8, 100° C.) of about 40 and having an ethylene content of about 40 wt. % and a 5-ethylidene-2-norbornene content of about 5.0 wt. %. The Mn of Vistalon 2504 is about 47,000, the Mv about 145,000 and the Mw about 174,000, all as measured by GPC.

The EPDM terpolymers used in the compositions of this invention usually have a number average molecular weight (Mn) as measured by GPC of about 10,000 to about 200,000, preferably from about 15,000 to about 100,000, most desirably from about 20,000 to about 60,000. The Mooney viscosity (ML, 1+8, 100° C.) is usually about 5 to about 60, preferably about 10 to about 50, and most desirably about 15 to about 40. The Mv as measured by GPC of the EPDM terpolymer is generally below about 350,000 and preferably below about 300,000. The Mw as measured by GPC of the EPDM terpolymer is generally below about 500,000 and preferably below about 350,000.

To sulfonate the polymer, the elastomeric or thermoplastic polymer is dissolved in a non-reactive solvent such as a chlorinated aliphatic hydrocarbon, chlorinated aromatic hydrocarbon, an aromatic hydrocarbon, or an aliphatic hydrocarbon. Examples of these are carbon tetrachloride, dichloroethane, chlorobenzene, benzene, toluene, xylene, cyclohexane, pentane, isopentane, hexane, isohexane or heptane. The sulfonating agent is added to the solution of the elastomeric polymer and a nonreactive solvent at a temperature usually of −100° C. to 100° C. for a period of about 1 to 60 minutes. Suitable sulfonating agents, as disclosed in U.S. Pat. Nos. 3,042,728 and 3,836,522, which are hereby incorporated by reference, are acyl sulfonates, a mixture of sulfuric acid and an acid anhydride or a complex of a sulfur trioxide donor and a Lewis base containing oxygen, sulfur, or phosphorus. Typical sulfur trioxide donors are $SO_3$, chlorosulfonic acid, sulfuric acid and oleum. Typical Lewis bases are dioxane, tetrahydrofuran, tetrahydrothiophene and triethylphosphate. The most preferred sulfonation agent is an acyl sulfate, for example, benzoyl, acetyl, propionyl or butyrylsulfate.

The sulfonating agent and the manner of sulfonation are not critical, provided that the sulfonation does not degrade the polymeric backbone. The reaction mixture may be quenched with an aliphatic alcohol, e.g. methanol, ethanol or isopropanol, an aromatic hydroxyl compound, e.g. phenol, or a cycloaliphatic alcohol, e.g. cyclohexanol, or with water. The unneutralized sulfonated polymer usually has about 5 to about 100 millimole equivalents (meq.) of sulfonate groups per 100 grams of sulfonated polymer, preferably about 10 to about 50, most desirably about 15 to about 40. The meq. of sulfonate groups per 100 grams of polymer may be determined either by titration of the polymeric sulfonic acid or by Dietert Sulfur analysis.

The sulfonated polymer may be neutralized by adding a solution of a carboxylic acid salt (for example a metal acetate) to the unneutralized polymer dissolved in the reaction mixture, e.g., of the aliphatic alcohol and non-reactive solvent. The carboxylate may be dissolved in a binary solvent system consisting of water and an aliphatic alcohol. Examples of suitable metal carboxylates are sodium acetate, barium acetate, magnesium acetate, aluminum acetate, potassium acetate, lead acetate and zinc acetate. Zinc acetate is preferred. Suitable cations for the neutralization of the sulfonate groups are ammonium, anitmony, aluminum, iron, lead and group IA, IIA, IB and IIB elements. Organic amines are also suitable neutralizing agents.

Sufficient carboxylate is added to the solution of the unneutralized sulfonated polymer to at least partially neutralize the sulfonate groups. It is preferable to neutralize at least about 95% of the sulfonate groups, more preferably about 98% and most preferably about 100% of the sulfonate groups.

A particularly preferred neutralized polymer for this invention is a zinc neutralized EPDM terpolymer containing about 75 wt. % ethylene, about 20 wt. % propylene and about 5 wt. % of 5-ethylidene-2-norbornene with a sulfonation level of about 20 meq. sulfonate groups per 100 grams of sulfonated polymer.

To achieve the desired neutralization, at least 5 parts (preferably at least 8 parts, and most preferably from 10 to 50 parts) of the metal salt are added for each 100 parts of the sulfonated polymer.

Preferential plasticizers useful in this invention are basic salts of carboxylic acid having from 2 to 30 carbon atoms, preferably from 5 to 22 carbon atoms, and having a metal ion which is antimony, aluminum, iron, lead or a metal of Groups IA, IIA, IB or IIB and mixtures thereof. Among the preferred carboxylic acids, from which the salt is derived, are lauric, myristic, palmitic, stearic acids and mixtures thereof. Of these, stearic and lauric acids are most preferred. The most preferred metal ions are zinc and magnesium. The most suitable preferential plasticizer is zinc stearate. Zinc stearate can be used in an amount of from 5 to 100 parts based on the neutralized sulfonated EPDM terpolymer, more preferably from 5 to 50 parts, and most preferably from 8 to 20 parts. The use of a preferential plasticizer aids in mixing and processing. These compounds "plasticize" the ionic bond rather than the polymeric substrate.

Any suitable mixing means may be used to prepare the compositions of this invention, such as Banbury internal mixer, transfer mixer, sigma bladed Werner & Pfleiderer type blenders and an open mill. For blends containing more than 50% of the ionic elastomer, Banbury or mill mixing is recommended.

As stated above, the compositions of the invention may advantageously contain fillers such as carbon black. Generally from 50 to 150 parts of filler are present for each 100 parts of the polymer-asphalt composition.

Table A lists the principal commercially available carbon blacks according to their ASTM code, as classified in ASTM D-1765, and their particle size. All of these materials may be used in the compositions of the invention.

TABLE A

| ASTM NO. | Particle Size, Millimicrons |
|---|---|
| N 110 | 19 |
| N 219 | 21 |
| N 220 | 22 |
| N 231 | 21 |
| N 234 | 19 |
| N 326 | 26 |
| N 330 | 28 |
| N 339 | 26 |
| N 347 | 26 |
| N 358 | 29 |
| N 375 | 27 |
| N 472 | 38 |
| N 539 | 47 |
| N 550 | 47 |
| N 642 | 60 |
| N 650 | 52 |
| N 660 | 52 |
| N 754 | 70 |
| N 762 | 75 |
| N 765 | 70 |
| N 774 | 75 |
| N 990 | 330 |

The carbon blacks numbered N100 to N899, having a particle size of less than 200 millimicrons, are generally used in the invention. Those having an ASTM No. D-1765 between N100 and N799 (particle size between 10 and 100 millimicrons) are preferred, and those having an ASTM D-1765 of N100 to N599 (particle size between 10 and 50 millimicrons) are most preferred. It is a preferred embodiment of the invention to use carbon blacks having different particle sizes.

Cost savings can be achieved by using other fillers such as coal and mineral fillers such as silica, mica, diatomaceous earth, talc, calcium carbonate, calcined clay and hydrated clay. Use of non-black fillers also permits the use of color. Silica in the range of 1 to 15 microns is the most efficient in preserving the balance of properties in non-black formulas.

Where it is desirable to improve the oxygen, ozone or ultraviolet resistance of the compositions, appropriate amounts of antioxidants, antiozonants and/or ultraviolet screening agents may be added. Generally, each of these materials is added in amounts from 0.05 to 5 parts by weight based on 100 parts of the ionic elastomer. Most preferably, the concentration would range from 0.2 to 2.5 parts, with a range of 0.5 to 2.0 parts being most preferred.

Specific antioxidants that can be used in the composition of this invention include dioctyldiphenylamine, dinonyldiphenylamine, didodecyldiphenylamine, di(alpha-methylbenzyl) diphenylamine, di(alpha,alpha-dimethylbenzyl) diphenylamine, and various other alkyl or aralkyl substituted diphenylamines and mixtures thereof. Also useful are 2,2'-methylenebis(4-methyl-6-t-butylphenol), 2,2'-methylenebis-(4-methyl-6-nonylphenol), styrenated phenol, polybutylated bis-phenol A, tetrakis[methylene(3,5-di-t-butyl-4-hydroxyhydrocinnamate)]methane, octadecyl beta(3,5-di-t-butyl-4-hydroxyphenyl) propionate and various other substituted phenols and bis-phenols; tris(nonylphenyl) phosphite and other substituted aryl phosphites; nickel dibutyldithiocarbamate, polymeric 1,2-dihydro-2,2,4-trimethylquinoline, mercaptobenzamidazole, alkylated mercaptobenzamidazole, and the zinc salt of mercaptobenzamidazole. Alkyl thiodipropionate synergists may also be employed in the antioxidant package. Particularly preferred antioxidants for the compositions of this invention are the alkyl and aralkyl diphenylamines.

Another component that may be added to the composition is a polyolefin thermoplastic. Polyolefin thermoplastics modify the hardness of the composition as well as modifying and improving its rheological properties. Among the polyolefins, polyethylene is preferred, with high density polyethylene most preferred. Usually 25 parts or less of the polyolefin per hundred parts of the polymer are used to prevent the composition from becoming to rigid.

Still another useful component is a release agent. Release agents promote processability of the composition. They are especially useful when the composition is calendered into sheet. Release agents include primary and secondary amides, ethylenebis-amides and waxes. Preferred are the primary amides, particularly, erucamide.

Optionally included in the composition is a microbiocide. This component is added where the composition is employed in a climate conductive to infestation of fungi and other microorganisms. The preferred microbiocides are selected 2,2'-thiobis(4,6-dichlorophenol), 10,10'-oxybisphenoarsine, 8-hydroxyquinoline and zinc dimethyldithiocarbamate.

Flame-retardants are also useful in the compositions of this invention. Examples of these flame-retardants are halogenated organic compounds, phosphorus containing compounds, antimony oxide and aluminum hydroxide.

Turning now to the method of fabricating the membrane, the unsupported membrane, comprising one or more plies of elastomeric sheet, may be formed by extrusion. These unique elastomeric sheets, although possessing properties at ambient temperatures analogous to vulcanized rubbers, are processable at elevated temperatures in a manner analogous to thermoplastics. Initially, the elastomeric composition is heated to between 100° to 250° C. and masticated, that is, subjected to shear force. This mastication is preferably performed in a rotating extrusion screw. The heated and masticated composition is then extruded through a die having uniform orifice dimensions suitable to produce the elastomeric sheet. The elastomeric extruded sheet may be cooled directly or conveyed to further processing, treatment or construction stations. The sheet or membrane, upon cooling, develops the required physical properties necessary for waterproof applications. It can be wound onto a roll for easy transportation or further processing, generally without the need for partitioning agents. Generally, the sheets have a thickness of from 10 to 120 mil, preferably from 20 to 80 mil, and a tensile strength of from 8 to 17 MPa. If preferred, two or more plies may be simultaneously extruded out of a plurality of dies and laminated together to form an elastomeric laminate.

The most preferred fabricating method is calendering. In this method the composition to be formed is heated to a molten state, generally to a temperature between 100° and 250° C., and then rolled out as a smooth sheet of the desired dimensions and physical properties by the mechanical action of counter-rotating cylindrical rolls. To produce the membrane of this invention, it is preferred that the spacing between cylindrical rolls be between 5 and 200 mils, that is, between 0.005 and 0.2 inch. A particular advantage of calendering is the ability to provide a laminate of two or more plies. Lamination prevents leakage caused by defects or flaws in any individual ply and can be conducted simultaneously with the calendering of individual plies. This is accomplished by the use of a multiple roll calender. For an example, in the case of the four roll calender, two plies are formed by calendering by the two outermost nips and then combined and bonded by heat and pressure in the third central nip. Alternatively, two sheets separately formed in calendering operations may be laminated together.

The supported membrane of this invention is, like the unsupported membrane, flexible. However, it includes at least one sheet of a supporting material, such as a fabric, woven or non-woven, paper or metal foil. Of these, fabric sheet is preferred. Fabric sheet used as reinforcement is commonly referred to as scrim. Whether the scrim be woven or non-woven, it is preferred that it be polyester, polypropylene, polyethylene, polyamide or combinations of two more more of these synthetic fabrics.

The non-woven construction may comprise needle-punched or spun-bonded fabric. However, the most preferred reinforcing agent has an open weave construction permitting the formation of a strong mechanical bond between the elastomeric plies striking through the open weave. The supporting or reinforcing ply, whatever its material, can be chemically treated or coated to further enhance ply adhesion. Supported membrane, especially open weave reinforced scrim, improves the strength, especially the tear strength, of the unsupported elastomeric sheet.

Incorporation of reinforcing sheets to form the supported membrane can be accomplished during the calendering or extrusion process employed in forming the elastomeric sheet of this invention. It is preferred, where a supported membrane is formed by extrusion or calendering, to synchronously feed the reinforcing sheet between two elastomeric sheets downstream of the extruder dies or calender rolls to form a three ply laminate. Heat and pressure are provided by a pair of laminating rolls. Multiple laminates of more than three plies can also be fabricated. Of course, a two ply laminate of elastomeric and support plies can also be formed. Likewise, the lamination procedure can be conducted in a stepwise manner as is known to those skilled in the art.

As mentioned earlier, a principal application of the membrane of the invention is as a roof covering. The types of roof which may be covered by the membrane are flat or slightly sloped and include new or retrofitted roof installations. The roof surface which is covered, referred to as the roof deck, may be wood, cement, metal, concrete or combinations thereof. In addition, the membrane employed as the roof covering may be affixed to insulation which may be disposed over the roof decks. Insulation such as wood fiberboard, expanded polystyrene, fiberglass board and rigid polyurethane board may be covered with the supported or unsupported membrane of this invention. The roof covering may be fully bonded to the roof surface, spot bonded (that is, partially bonded), loose laid and ballasted, or mechanically bonded by methods such as battens, discs or buttons.

The membrane of this invention may also be employed for roof flashing. In this function the membrane covers roof protrusions, drains, gutters, outlets, edge trims, parapet wall terminations, corners and other roof details. The membrane may also be employed as a pond liner, a pit liner or aqueduct liner or in other water storage or water conveyance systems. These applications have grown in recent years since ponds and pits are increasingly used to treat and dispose of aqueous wastes from such facilities as chemical plants, power plants and mines.

The membranes of the invention provide the same water impermeability and weather resistance as do such vulcanized rubbers as butyl rubber and EPDM. However, because those rubbers are vulcanized, they can only be formed during installation into the large panels necessary for use as roof covering, pond liners, etc., by means of adhesive bonding of smaller sized membranes. Such adhesive seams are subject to delamination under the stressful conditions encountered.

The membranes of the invention may also be joined together to provide the large panels required for roof coverings, pond liners and the like. Joining may be accomplished by heat sealing, solvent welding, adhesive bonding, staple bonding or combinations thereof. The peferred means, one that cannot be used with the thermosetting rubbers of the prior art, is heat sealing. When heat sealing is employed, the most desirable method is hot air welding. Hot air welding provides a high strength integral bond without the introduction of any foreign materials.

To illustrate the invention in greater detail, the following examples are set forth. The three asphalts tested and their physical properties are designated in the table below.

TABLE B

| Asphalt | A | B | C |
| --- | --- | --- | --- |
| Softening point, °C. | 55–66 | 70–80 | 82–93 |
| Flash point, °C. | 225 | 225 | 205 |
| Ductibility at 25° C. | 10 | 3 | 2 |
| Tensile Strength, psi | 140 | | 203 |
| MPa | 0.97 | | 1.4 |

The sulfonated polymer has an ethylene/propylene ratio of 52/48, a 5-ethylidene-2-norbornene content of 5.5%, sulfonic group content 25 mmol and 90 meq. of zinc ion per 100 g elastomer. The tensile strength of this material containing 8.02 parts of zinc stearate is 800 psi or 5.52 MPa.

EXAMPLE 1

Several compositions were prepared by thoroughly blending on a mill at 150° C. asphalt, the sulfonated elastomer, and zinc stearate. Samples 6"×6"×0.060" were compression molded and their physical properties determined when cut to the sizes required by applicable ASTM standards.

Table 1 sets forth the specific recipes employed and the results obtained.

TABLE 1

| Run No. | 1 | 2 | 3 | 4 | 5 | 6 |
| --- | --- | --- | --- | --- | --- | --- |
| Recipe | | | | | | |
| Asphalt A | 8.5 | 31.6 | 48.1 | — | — | — |
| Asphalt C | — | — | — | 8.5 | 31.6 | 48.1 |
| SEPR | 84.7 | 63.3 | 48.1 | 84.7 | 63.3 | 48.1 |
| Zinc Stearate | 6.8 | 5.1 | 3.8 | 6.8 | 5.1 | 3.8 |
| SEPR/asphalt | 91/9 | 67/33 | 50/50 | 91/9 | 67/33 | 50/50 |
| Properties [ASTM D-412-68] | | | | | | |
| Tensile Strength, | | | | | | |
| psi | 1240 | 2420 | 2230 | 1150 | 2040 | 1590 |
| MPa | 8.56 | 16.70 | 15.39 | 7.94 | 14.1 | 10.97 |
| Elongation, % | 310 | 520 | 570 | — | — | — |

TABLE 1-continued

| Run No. | 1 | 2 | 3 | 4 | 5 | 6 |
|---|---|---|---|---|---|---|
| 300% Modulus, MPa | 8.3 | 5.9 | 4.3 | 8.1 | 6.1 | 4.8 |

The above data clearly show that the tensile strength of the blends are considerably higher than either the asphalt or the ionic elastomer alone. This is most surprising since one skilled in the art would expect such blends to have intermediate tensile strength values. Note particularly that in certain instances the tensile strength of the blend is some three times higher than the ionic elastomer per se.

EXAMPLE 2

The procedure of Example 1 is repeated, except Asphalt B was used. The physical properties of the blends containing 8.5, 31.6 and 48.1 parts of said asphalt fall substantially between the values obtained from corresponding Runs No. 1–3 and 4–6, respectively.

EXAMPLE 3

Following the procedures outlined in Example 1, the following compositions were prepared and their physical properties determined:

TABLE 2

| Recipe | | |
|---|---|---|
| Asphalt A | 40 | 90 |
| SEPR | 100 | 100 |
| Zinc stearate | 20 | 20 |
| N339 Carbon Black | 90 | 90 |
| Antioxidant tetrakis[methylene-(3,5-di-t-butyl-4-hydroxyhydrocinnamate)]methane | 1 | 1 |
| Properties | | |
| Tensile strength, MPa | 11.4 | 11.3 |

The compositions are well suited for roofing membranes and pond liners.

What is claimed is:

1. An elastomeric composition comprising
   (a) asphalt;
   (b) preferential plasticizer; and
   (c) neutralized sulfonated polymer in a weight ratio of neutralized sulfonated polymer to asphalt of from about 30/70 to about 95/5.

2. The composition of claim 1 wherein the neutralized sulfonated polymer is a neutralized sulfonated ethylene-propylene polymer.

3. The composition of claim 2 wherein the ethylene-propylene polymer is a terpolymer.

4. The composition of claim 1 wherein the polymer is neutralized with a carboxylic acid salt of zinc.

5. The composition of claim 4 wherein the preferential plasticizer is present from about 8 to 20 parts based on 100 parts of the polymer.

6. The composition of claim 5 wherein the preferential plasticizer is zinc stearate.

7. The composition of claim 1 wherein the composition further comprises from 5 to 40 wt. % of a filler based on the total weight of the asphalt and the neutralized sulfonated polymer.

8. The composition of claim 7 wherein the filler is carbon black, silica or mixtures thereof.

9. A waterproof membrane comprising a sheet material having the composition of claim 1 and a thickness of from about 10 to 120 mil.

10. The waterproof membrane of claim 9 wherein the thickness is from about 20 to 80 mil and the tensile strength is from about 8 to 17 MPa.

11. The composition of claim 1 wherein the weight ratio of neutralized sulfonated polymer to asphalt is in the range of from about 50/50 to about 91/9.

* * * * *